Dec. 15, 1953  LE MOYNE M. RUTHERFORD  2,662,293
MICROMETER AND ATTACHMENT
Filed July 3, 1952  2 Sheets-Sheet 1
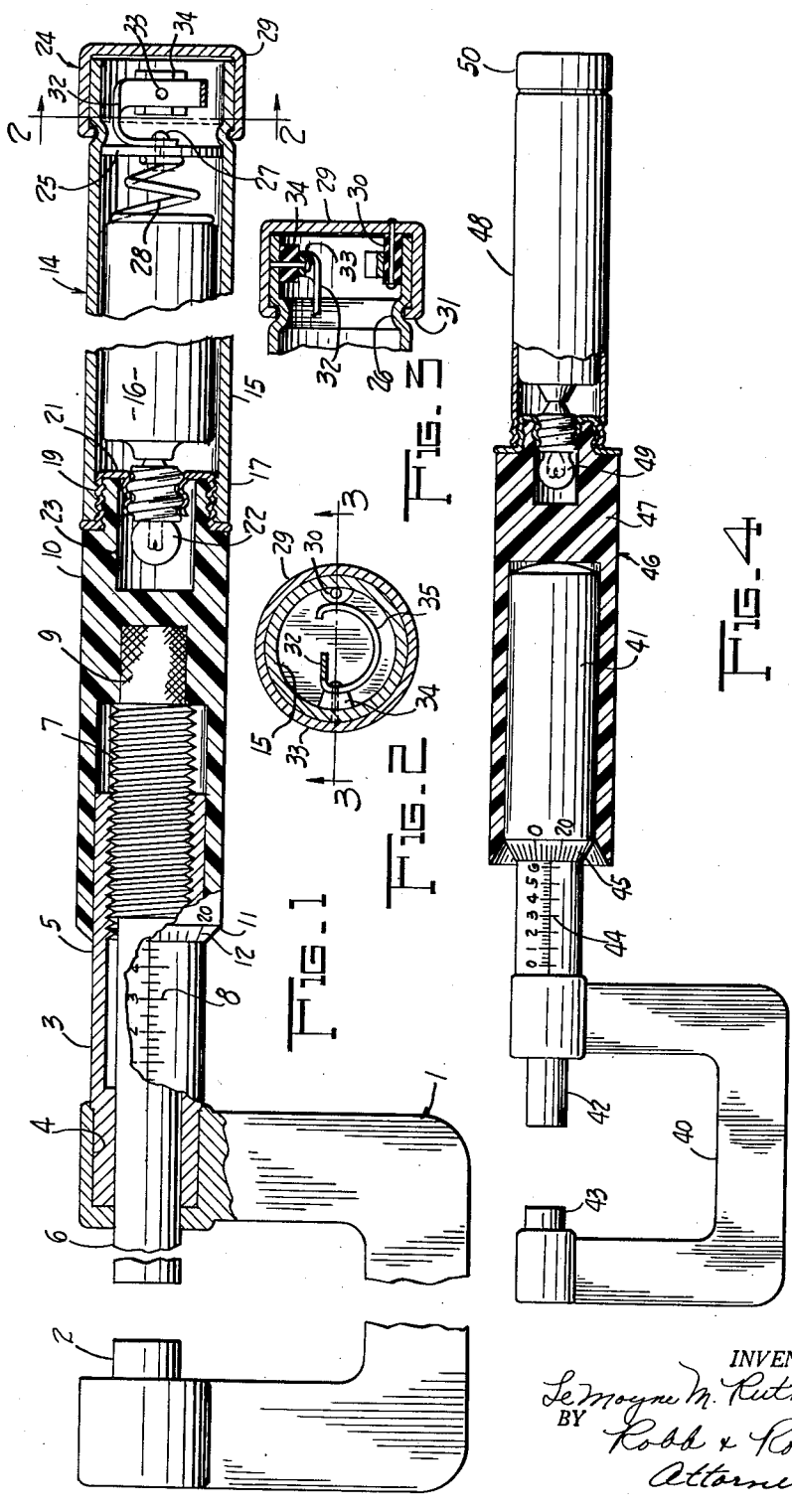
INVENTOR.
Le Moyne M. Rutherford
BY Robb & Robb
Attorneys Dec. 15, 1953 LE MOYNE M. RUTHERFORD 2,662,293
MICROMETER AND ATTACHMENT
Filed July 3, 1952 2 Sheets-Sheet 2
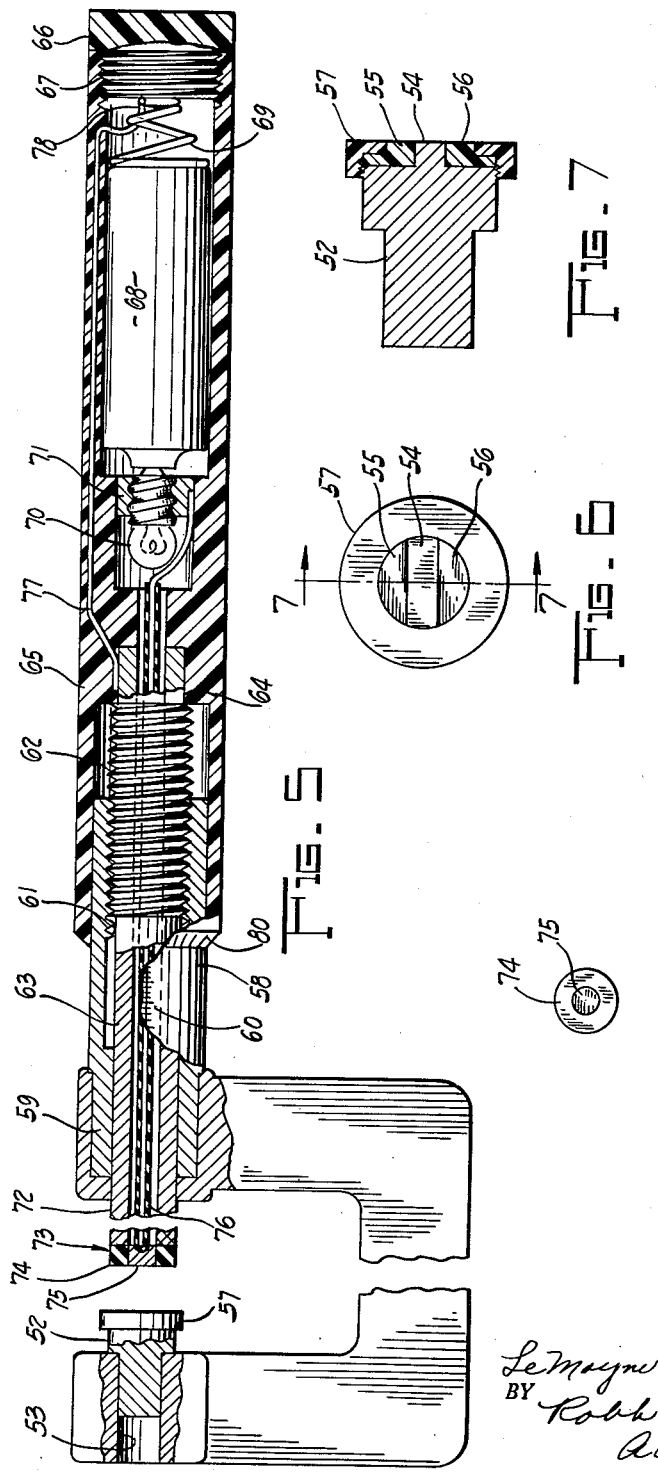
INVENTOR.
Le Moyne M. Rutherford
BY Robb & Robb,
Attorneys Patented Dec. 15, 1953

2,662,293

UNITED STATES PATENT OFFICE 2,662,293

MICROMETER AND ATTACHMENT

Le Moyne M. Rutherford, Ypsilanti, Mich.

Application July 3, 1952, Serial No. 297,005

8 Claims. (Cl. 33—164)

This invention relates to micrometers and particularly to the problems involved in the use of the same as respects the determining of the measurement made thereby.

One of the primary contemplations of this invention is to vastly increase the visibility of the indicia usually provided on micrometers or other similar measuring instruments.

Still a further contemplation of this invention is to simplify the use of micrometers in a manner to make the readings taken thereby of greater uniformity regardless of the person who uses the same.

A further concept is involved in providing for increased visibility of micrometers presently in use, without necessitating replacement of the same, but availing of a simple addition thereto.

As is well known at the present time in the use of micrometers, the same are generally provided with indicia thereon which, in cooperation with a movable member, and the other parts of the micrometer, serve to provide various dimensions of one type or another. As is true and realized by those who use such instruments, there is often encountered some difficulty in ascertaining the exact reading which the micrometer accurately provides, but which by reason of the difficulty of visibility, is sometimes misinterpreted by the person using the same.

Often in the use of a micrometer it is necessary to initially effect the adjustment of the same, and to thereafter move the instrument itself into a place where sufficient light is afforded to make the actual measurement determination readily visible. It is obvious that such a procedure is a considerable waste of effort, not to mention time involved in transporting and returning to the position from which the reading was taken.

It is therefore a principal object of this invention to provide a micrometer with means for greatly increasing the visibility of the indicia thereon whereby the reading may be immediately ascertained without waste of time.

It is a further object of this invention to provide a micrometer with means built into the construction of the same whereby the visibility of the various indicia provided thereon is vastly increased, without materially altering the construction of the micrometer and in no way affecting the accuracy thereof.

It is a still further object of this invention to provide a micrometer with means whereby the reading to be taken thereby is instantaneously made available upon manipulation of the micrometer, and is not determined in any sense by the person using the same, since an appropriate signal is given when the reading is to be taken and it will always be the same regardless of the person who is handling the instrument.

It is a still further object of this invention to provide an attachment for micrometers which are presently in use, which, by the simple provision of suitable illuminating means readily attached to the micrometer, makes the visibility of the indicia carried thereby readily available for reading the same.

It is a still further object of this invention to avail of the known optical qualities of certain plastic materials whereby light is transmitted therethrough to a point remote from the origin of the light and to thereafter avail of this transmission of light to make the visibility of the indicia on the micrometer readily available.

It is a further object of this invention to provide a simple self-contained arrangement which may be incorporated into the micrometer or may be provided as an attachment therefor, whereby the visibility above generally mentioned, is increased and the use of the instrument or tool is vastly facilitated.

It is a still further object of this invention to so arrange a micrometer without materially altering the normal construction thereof so as to avail of the manipulation of the same to render a visible signal available which will indicate without variation the adjustment of the micrometer as having been finally attained so that the same reading may be obtained by all those who use the instrument without regard to the particular manner in which the same is handled.

Other and further objects of this invention will be more fully set forth in the specification appended hereto, and shown in the drawings, wherein:

Figure 1 is an enlarged view largely in section, illustrating the micrometer constructed in accordance with this invention.

Figure 2 is a transverse section taken about on the line 2—2 of Figure 1, illustrating certain of the control means for the visibility increasing arrangement provided by this invention.

Figure 3 is a sectional view, taken about on the line 3—3 looking in the direction of the arrows, further setting forth certain of the details of the control mechanism above referred to.

Figure 4 is a view, partly in section, showing one form of the attachment constructed in accordance with the invention.

Figure 5 is a view similar to Figure 1, being a longitudinal sectional view showing a modification of the micrometer construction whereby the signaling arrangement is further illustrated.

Figure 6 is an end view of the anvil only.

Figure 7 is a transverse sectional view taken about on the line 7—7 of Figure 6, looking in the direction of the arrows.

Figure 8 is an end view of the stem of the micrometer illustrating certain details therein.

Referring now to Figure 1, there is shown a largely conventional micrometer which includes a substantially U-shaped frame generally designated 1, at one end of the same there being provided the anvil 2 suitably fixed to the frame. At the other end of the U-shaped frame 1, a column 3 is provided and is shown as having been pressed or otherwise fit into the usual opening 4 provided in the frame 1. As is well known, the column 3 includes at the interior thereof as indicated at 5, the threaded portion adapted to receive a stem 6 having a corresponding threaded portion 7 thereon, for coaction with the threads 5 of the column 3, the stem 6 further extending outwardly toward the anvil and being usually manipulated by rotation of the said stem toward and from the anvil as controlled by the coaction of the threads 5 and 7.

As is also generally provided, the column 3 is embossed with the indicia 8 thereon, said indicia extending longitudinally of the column.

At one end, the stem 6 is provided with a knurled or otherwise suitably formed portion 9 thereon, which is suitably fixed to a barrel, designated 10, which barrel 10 is of generally tubular formation including at its open end the beveled portion 11, upon which indicating means are provided for coaction with the indicia 8 previously referred to—the indicating means being denoted 12 herein.

The barrel 10 is, in this particular form of the invention, preferably made of a suitable plastic such as of the acrylic type, which plastic has the quality of transferring light therethrough for the purpose which will be hereinafter set forth. At the closed end 13 of the barrel 10 (it being remembered that the barrel 10 is entirely formed of the plastic material above referred to), there is provided a suitable light unit generally designated 14. The light unit 14 may be an ordinary pencil-type of flashlight battery operated unit, and includes an outer casing 15 within which is adapted to be received a suitable battery 16, the casing 15 being formed of a light gauge metal in accordance with conventional practice. At one end of the casing 15 the same is provided interiorly thereof with threads 17, adapted to engage the reducing bushing 19 which bushing in turn is suitably threaded so as to engage corresponding threads 20 formed on the outer end of the barrel 10. Within the bushing 19 there is provided a suitable threaded portion 21 in which a light bulb 22 may be mounted, said light bulb 22 being of the flashlight type. It will be noted that the light bulb is seated interiorly in a suitable opening 23, in the outer end of the barrel 10, and is adapted to be lighted or turned off by means of the switch unit indicated at 24. The switch unit 24 includes a fiber washer 25, suitably seated against a shoulder 26 formed on the casing 15, the fiber washer 25 having fastened at one side by means of a suitable rivet 27 the spring 28, adapted to engage the end of the battery 16 as is usual.

Further, the switch unit 24 includes a rotatable cap member 29 which encloses the switch mechanism including an insulating block 30 suitably fastened to the interior of the cap 29 so as to be rotatable therewith. The cap 29 is formed with an inwardly rolled portion 31 thereon, adapted to engage with the shoulder 26 to prevent displacement of the cap from the light unit 14. Suitably fastened to the outer end of the casing 15, is a contact strip designated 32, by means of a fiber stud 33, spaced from the inner wall of the casing 15 by a spacer block 34. The contact strip 32 is formed of spring-like material, and includes the portion 35 which is adapted to contact the inner surface of the casing 15 in order to complete the circuit so as to light the lamp bulb 22 previously referred to. It will be apparent that rotation of the cap 29 with the insulating block 30 thereon, will engage the outer end of the flexible portion 35 of the contact strip 32 to thereby raise the same out of engagement with the inner wall of the casing 15 to thereby interrupt the circuit. Clearly manipulation of the cap 29 in any suitable manner may be availed of to light the lamp 22 as occasion demands.

In view of the foregoing explanation of the invention just above described, it will be apparent that the micrometer here set forth is generally of the familiar shape and includes generally familiar parts, and that manipulation of the barrel 10 thereof so as to cause the indicating means 12 to be rotated, and the stem 6 to move inwardly and outwardly in cooperation with the indicia 8, will be able to provide a reading. Further, it should be noted that in view of the peculiar optical qualities of the plastic from which the barrel 10 is formed, when the lamp 22 is lighted by manipulation of the cap 29, light will be transmitted throughout the barrel 10 and be emitted at the indicating means 12, thus enabling a quick ascertainment of the measurement obtained by the manipulation above described. It is thus obvious that there is no requirement to have separate light to make readily available the reading of the micrometer, but that the light is built into the barrel of the micrometer and thus a self-contained unit is provided, making for facility of reading the same under all types of conditions.

In Figure 4 of the drawings, there is shown a modification of the invention involving the use of a standard micrometer generally designated 40, the same including the usual frame, anvil, stem, column and barrel 41 thereon. The barrel 41 of course may be manipulated by rotation thereof, to move the stem 42 toward and from the anvil 43. The usual indicia 44 are provided for cooperation with the indicating means 45 on the barrel 41. In this form of the invention, the illuminating unit generally designated 46 is shown as being comprised of a generally tubular member 47, adapted to receive interiorly thereof and to closely engage and be frictionally held on the barrel 41 of the micrometer. This member 47 is constructed of a plastic material which has the quality previously mentioned with regard to the barrel 10 of the micrometer shown in Figure 1, of transmitting light therealong so as to be emitted at the open end thereof, close to and directed at the indicating means 45 and the indicia 44. A suitable light generating device 48 is provided, being substantially the same as the device 14 in Figure 1, and likewise suitably positioned on the member 47 by threaded engagement therewith. The bulb or lamp 49 of the unit 48, is likewise situated interiorly of the end of the member 47, so as to effect illumination of the said member and subsequent transmission of light thereby. Suitable manipulation of the end 50 of the unit 48 may be resorted to so as to turn the lamp 49 on and off as occasion demands.

In view of the foregoing explanation of the modification shown in Figure 4, it will be apparent that by the provision of a unit such as 46, any micrometer at present in use may be equipped with means for illuminating the indicia and indicating means thereof by the simple attachment provided by slipping the member 47 over the barrel 41 of the micrometer.

Turning now to a consideration of Figure 5 herein, there is shown a further modification of the micrometer of this invention which involves a signaling arrangement to indicate when the final adjustment of the micrometer has been made so as to make the same readily usable by any person without regard to previous experience as is generally required by micrometers presently in use. The micrometer here shown in Figure 5 includes a frame 51, having at one end thereof the anvil 52, which anvil is suitably formed of metal or the like and received in the opening 53 provided therefor.

In this particular instance, the anvil 52 is constructed so as to include therein a central contact shoe or tongue portion 54 which extends transversely across the anvil, and is formed therewith, the same being generally in line with the frame 51 of the micrometer. At opposite sides of the tongue or shoe 54, there are provided insulating segments, designated 55 and 56, which are maintained in their position as shown in Figure 7, by means of a ring 57, said ring 57 being formed of insulating material similar to the insulating material from which the segments 55 and 56 are formed. The ring 57 may be suitably fixed on the anvil 52 by means of the usual threaded connection as shown in the drawing. The purpose of the foregoing will be set forth further hereinafter.

At the other end of the frame 51, the usual column 58 is provided, the same being suitably fitted into the opening 59 formed in the frame 51. The column 58 further is provided with indicia 60 thereon, at its outer surface and extending along the column, the same being equipped interiorly as is true in the micrometer shown in Figures 1 and 4, with threaded portion 61 adapted to engage a corresponding threaded portion 62 on a stem 63, the stem 63 extending through the column 58 in accordance with conventional micrometer construction. The stem 63 further extends outwardly and to the rear of the column 58, and is suitably engaged at 64 with a barrel 65, the barrel 65 being very similar to the barrel 19 of the micrometer shown in Figure 1. The barrel 65 is, as was true of barrel 10, formed of a plastic which may be of the acrylic type which has the optical characteristics of transmitting light therethrough and therealong for the same purpose as was set forth previously in conjunction with a description of Figures 1 and 4. In this particular form of the invention, however, the barrel 65 may be of somewhat elongated construction; at its outer end being provided with a suitable removable cap 66 maintained in threaded engagement by the threads 67 with the barrel 65. The cap is removable so as to permit the emplacement within the barrel 65 of a suitable battery 68 for purposes which will be subsequently clear. The cap 66 may also be preferably provided with a spring 69 adapted to press against the battery 68 to compel the battery to move into contact with a suitable lamp 70, seated in a suitable metallic ring 71 fixed in any preferred manner interiorly of the barrel 65. The lamp 70 is of course threadedly engaged with the ring 71 as will be obvious.

Returning now to a description of the stem 63, it will be noted that the same is provided with a longitudinally extending passage 72 therein, extending from the free end of the stem, the free end of the stem 73 being provided at its periphery with insulating washer 74 (see Figure 8), and a contact 75, which contact 75 is suitably connected to a wire 76, extending through the passage 72 to the rear end of the stem 63. At the rear end of the stem 63 the wire 76 is suitably fastened in contact with the ring 71 previously mentioned, it being clear that the wire 76 is suitably insulated from the stem 63 which is usually of metallic construction. At the point of engagement of the stem 63 with the barrel 65, a further wire 77 is present, which will contact with the metallic stem 63 and may be cast or otherwise formed with the barrel 65, and extends therethrough and is attached at 78 to the spring 69 previously mentioned.

In view of the foregoing description, it will be apparent that when a metal piece to be measured by the micrometer hereof is inserted between the anvil 52 and the end of the stem at which the contact 75 is located, by suitable manipulation of the barrel 65, the contact 75 may be brought into position so as to contact the surface of the material being measured, the opposite surface thereof being seated upon the anvil and in contact with the contact shoe 54, whereby a circuit will thus be completed through the frame 51 on one hand, to the stem 63, thence to the wire 77 and to the spring 78 which is in contact with the rear end of the battery 68. On the other hand, the other portion of the circuit is completed by the wire 76, extending through the stem 63 and in contact with the ring 71 in which the lamp bulb 70 is seated. The lamp bulb 70 of course will be in contact with the usual member 79 provided on the battery, and thereby the circuit is completed and the lamp bulb 70 is lit. Since the lamp bulb 70 is lighted by such manipulation as above described, the light thereof will be transmitted through the barrel 65 by reason of the peculiar optical qualities of which the same is formed, and thence to the indicating means 80 carried at the outer end thereof. The indicating means 80 in cooperation with the indicia 60 will thus make available a ready ascertainment of the actual dimensions of the material being measured, the exact instant at which the measurement is attained being ascertained by the provision of the contact shoe 54 and the contact point 75 between which the material is situated. The foregoing readily makes apparent that manipulation of the micrometer by anyone, whether skilled or not, will be simplified so that a reading may be obtained which, in all cases, will be uniform by reason of the instantaneous signal provided by the lamp 70 when complete circuit is effected through the instrumentalities previously described.

It should be understood that the light units used in the respective modifications shown above and described, may be of any preferred form and the one herein shown is merely an exemplification of one form which may be adopted.

In view of the foregoing description, it will be apparent that there is provided by this invention a vastly increased usefulness for micrometers whereby readings may be obtained from the use of the same without requiring the removal of the same from the position of measurement, and possible inaccuracy resulting thereby. By reason of the characteristics of the light transmitting element, light is directed to the position at which the indicia and indicating means are provided, so that the cooperation between the respective indicia and indicating means may be readily ascertained for the measurement being sought.

I claim:

1. In a micrometer of the class described, in combination, a frame, a column fixed thereto and having indicia thereon, a stem movable with respect to said column, light transmitting barrel surrounding said column and connected to said stem, indicating means coordinated with the indicia aforesaid, and a source of light for said barrel.

2. In a micrometer in combination, a frame, a column fixed to said frame, indicia on said column, a stem movable in said column, a barrel fixed to said stem and movable therewith, said barrel being formed of light transmitting plastic, a source of light for said barrel, and control means for said light source.

3. A micrometer as claimed in claim 2, wherein indicating means are formed on said barrel for cooperation with the indicia and the source of light illuminates both the indicia and the said indicating means.

4. In a micrometer of the class described, in combination, a frame, a first contact element carried thereby, a stem movable with respect to said frame and having a second contact element carried thereby, and a light unit operable upon completion of the circuit between said first and second contacts.

5. In a micrometer of the class described, in combination, a frame, a first contact element carried thereby, a stem movable with respect to said frame and having a second contact element carried thereby, indicia supporting means fixed to the frame, indicia formed on said means, and a light unit operable upon completion of the circuit between said first and second contacts, said light being directed to the indicia upon such circuit completion.

6. The combination with a micrometer comprising a frame, a column fixed to the frame, indicia on said column, a stem movable with respect to said column, and a barrel fixed to said stem and cooperating with the indicia aforesaid, of an attachment mounted on said barrel comprising a self-contained light unit, including a light transferring member surrounding the barrel and movable therewith for directing light therefrom to the said indicia, and a battery operated light generating device mounted on said member.

7. The combination as claimed in claim 6, wherein the light transferring member is a tubular plastic member and is frictionally engaged with the barrel, the light generating device is removably fastened at the outer end of the plastic member, and the plastic member terminates near the inner end of the barrel.

8. The combination with a micrometer comprising a frame, a column fixed to the frame, indicia on said column, a stem movable with respect to said column, and a barrel fixed to said stem provided with indicating means cooperating with the indicia aforesaid, of an attachment mounted on said barrel, comprising a self-contained light unit including a removable tubular light transferring member terminating at one end adjacent the indicating means, for directing light to said means and indicia, and a battery operated light generating device removably mounted at the other end of said member, said device including a control therefor.

LE MOYNE M. RUTHERFORD.

References Cited in the file of this patent

UNITED STATES PATENTS

| Number | Name | Date |
| --- | --- | --- |
| 1,098,694 | Starrett | June 2, 1914 |
| 2,217,509 | Bryant | Oct. 8, 1940 |
| 2,407,106 | Shelby | Sept. 3, 1946 |

FOREIGN PATENTS

| Number | Country | Date |
| --- | --- | --- |
| 727,262 | Germany | Sept. 24, 1942 |